(12) United States Patent
Walker (10) Patent No.: US 9,684,632 B2
(45) Date of Patent: Jun. 20, 2017

(54) PARALLEL PROCESSING AND INTERNAL PROCESSORS

(75) Inventor: Robert Walker, Raleigh, NC (US)

(73) Assignee: Micron Technology, Inc., Boise, ID (US)

( * ) Notice: Subject to any disclaimer, the term of this patent is extended or adjusted under 35 U.S.C. 154(b) by 965 days.

(21) Appl. No.: 12/478,412

(22) Filed: Jun. 4, 2009

(65) Prior Publication Data

US 2010/0312997 A1 Dec. 9, 2010

(51) Int. Cl.
*G06F 15/78* (2006.01)
*G06F 9/30* (2006.01)

(52) U.S. Cl.
CPC ........ *G06F 15/7842* (2013.01); *G06F 9/3001* (2013.01); *Y02B 60/1225* (2013.01)

(58) Field of Classification Search
CPC .................................................... G06F 9/3001
See application file for complete search history.

(56) References Cited

U.S. PATENT DOCUMENTS

| 4,258,419 A | * | 3/1981 | Blahut | ................ | G06F 9/30014 |
| | | | | | 712/210 |
| 6,877,084 B1 | * | 4/2005 | Christie | .............. | G06F 9/30036 |
| | | | | | 711/125 |
| 2007/0067605 A1 | | 3/2007 | Chang | | |
| 2008/0270751 A1 | | 10/2008 | Montvelishsky et al. | | |

OTHER PUBLICATIONS

Hennessy et al. "Computer Organization and Design: The Hardware/Software Interface" Morgan Kaufmann Publishers, 2nd Edition, 1998.*
Maya Gokhale; David Sarnoff Research Center; Processing in Memory: The Terasys Massively Parallel PIM Array; 8153, Computer Apr. 28, 1995, No. 4, Los Alamitos, CA, US; pp. 23-31.
Peter M. Nyasulu, et al.; Minimizing the Effect of the Host Bus on the Performance of a Computational RAM Logic-in-Memory Parallel-Processing System; IEEE 1999; pp. 631-634.
Nobuyuki Yamashita, et al.; A 3.84 GIPS Integrated Memory Array Processor with 64 Processing Elements and a 2-Mb SRAM; Nov. 1994, No. 11, New York, US.
Jeffrey Draper, et al.; Implementation of a 32-bit RISC Processor for the Data-Intensive Architecture Processing-in-Memory Chip; University of Southern California Information Sciences Institute; 2002.

(Continued)

*Primary Examiner* — Jacob A Petranek
(74) *Attorney, Agent, or Firm* — Fletcher Yoder, P.C.

(57) ABSTRACT

Systems, internal processors, and methods of parallel data processing in an internal processor are provided. In one embodiment, an external controller sends instructions to a memory device, and the internal processor on the memory device executes the instructions on the data. The internal processor may include one or more arithmetic logic units (ALUs), and each ALU may perform an operation on an entire operand, such that one or more operands may be processed in parallel by one or more ALUs in the internal processor. The operations may be completed on each operand in one or more cycles through the circuitry of the ALU, and the path of the operands through the ALU may be based on the width of the ALU, the size of the operands, or the type of operation to be performed.

14 Claims, 8 Drawing Sheets

(56) References Cited

OTHER PUBLICATIONS

U.S. Appl. No. 12/478,465, filed Jun. 4, 2009, Walker.
U.S. Appl. No. 12/478,527, filed Jun. 4, 2009, Walker.
U.S. Appl. No. 12/478,532, filed Jun. 4, 2009, Walker.
U.S. Appl. No. 12/478,450, filed Jun. 4, 2009, Walker.
U.S. Appl. No. 12/478,457, filed Jun. 4, 2009, Walker.
U.S. Appl. No. 12/603,376, filed Oct. 21, 2009, Walker et al.
U.S. Appl. No. 12/603,393, filed Oct. 21, 2009, Walker et al.
Aug. 12, 2013 Taiwan Office Action and Search Report for counterpart Taiwan Patent Application No. 099118247.

* cited by examiner

PARALLEL PROCESSING AND INTERNAL PROCESSORS

BACKGROUND

Field of Invention

Embodiments of the invention relate generally to memory systems, and more particularly, to memory systems having internal processors.

Description of Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light and not as admissions of prior art.

Electronic systems typically include one or more processors, which may retrieve and execute instructions, and output the results of the executed instruction, such as to store the results to a suitable location. A processor generally includes arithmetic logic unit (ALU) circuitry, which is capable of executing instructions such as arithmetic and logic operations on one or more operands. For example, the ALU circuitry may add, subtract, multiply, or divide one operand from another, or may subject one or more operands to logic operations, such as AND, OR, XOR, and NOT logic functions. The various arithmetic and logic operations may have different degrees of complexity. For example, some operations may be performed by inputting the operand(s) through the ALU circuitry in one cycle, while other operations may utilize multiple clock cycles.

A number of components in the electronic system may be involved in directing a set of instructions to the ALU for execution. In some devices, the instructions and any corresponding data (e.g., the operands on which the instructions will be executed) may be generated by a controller, or some other suitable processor in the electronic system. As the time or number of clock cycles required for the execution of a set of instructions may vary depending on the type of operation, the instructions and/or data may be written to a memory device, for example, a memory array, before being executed by the ALU. The instructions and data may be retrieved and sequenced and/or buffered before the ALU begins to execute the instructions on the data.

To improve processing performance, the steps of writing, reading, sequencing, buffering, and executing instructions and/or data may occur substantially simultaneously on different instructions, or different parts of an instruction. This parallel processing may be referred to as "pipelining." The performance of the device may also be improved in a processor-in-memory (PIM) device, where the processor (e.g., the ALU) is implemented directly on the memory device, conserving power in processing. Further, processing performance of the electronic system may also be improved in the data processing of the ALU.

BRIEF DESCRIPTION OF DRAWINGS

Certain embodiments are described in the following detailed description and in reference to the drawings in which.

DETAILED DESCRIPTION

Arithmetic logic unit (ALU) circuitry is generally used to process instructions in multiple stages. Processing the instructions may include executing the instructions, and storing the results of the executed instructions. More specifically, instructions, and the data on which the instructions will be executed, may be sent by a controller to the ALU, and may first be stored in a memory device to be retrieved when the ALU circuitry is available to execute the instructions. Once the instructions have been executed, the ALU may write the results of the operation to a memory component, or to any other suitable output.

In one or more embodiments of the present techniques, one or more processors, such as ALUs, may be packaged with a memory device. For example, the memory device may be a processor-in-memory (PIM), and may include embedded ALUs and a memory array, which may store instructions and data to be executed by the ALUs and the results from the completed instructions. In other embodiments, the ALUs and the memory array may be on unique dies in the same package. For example, the ALUs and the memory array may be arranged in a multi-chip package (MCP), and may be electrically connected by one or more through-silicon vias (TSVs). Processors which are embedded on a memory device, or packaged with a memory component in a memory device, may be referred to as "internal processors," as they are internal to the memory device. As used herein, a "compute engine" may be an example of an internal processor, and may be embedded on or packaged in a memory device in accordance with the present techniques.

While a processor that is external to the memory device may require an external input/output (I/O) to transfer information (e.g., instructions and/or data) to and from the memory array of the memory device, a compute engine may conserve power consumption by allowing information to be transferred between the memory array and the compute engine without an external I/O. The memory device may also include components such as a sequencer to organize the instructions, and a memory component such as a buffer to hold data before the compute engine performs the operations.

As discussed, the compute engine may perform various mathematical and logical operations, and may also be referred to as an internal processor of the memory device.

The compute engine may have a number of basic building blocks, which may be ALUs that are each one byte wide. The ALUs of the compute engine may be configured in a way to improve processing performance. One embodiment of the present technique involves a memory device having an embedded compute engine configured for parallel data processing. Parallel data processing in the compute engine may enable one ALU of the compute engine to operate on one operand. While each ALU may take more than one cycle to complete an instruction on an operand, each of the ALUs in the compute engine may process a different operand, allowing the compute engine to process multiple operands in parallel. Thus, in accordance with the present parallel processing techniques, a memory device having an embedded compute engine may process a larger amount of data within the same memory device.

Figure 1:
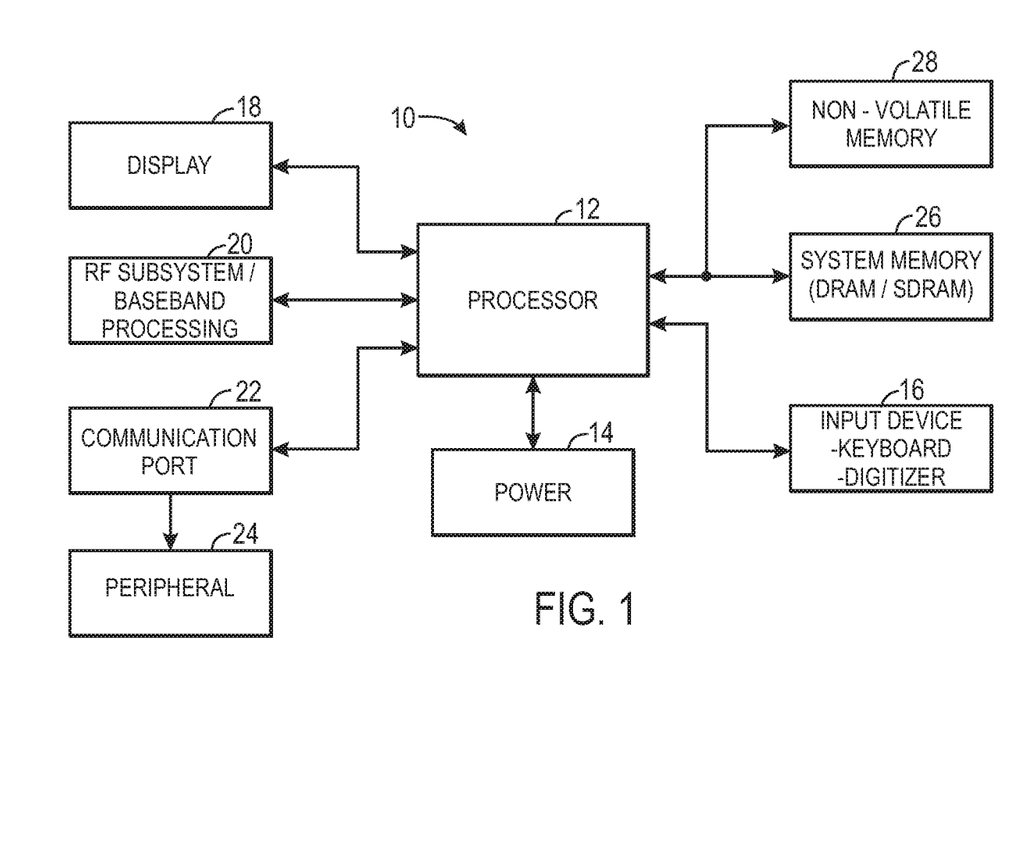
FIG. 1 depicts a block diagram of a processor-based system in accordance with an embodiment of the present technique.

Now turning to the figures, FIG. 1 depicts a processor-based system, generally designated by reference numeral 10. As is explained below, the system 10 may include various electronic devices manufactured in accordance with embodiments of the present technique. The system 10 may be any of a variety of types such as a computer, pager, cellular phone, personal organizer, control circuit, etc. In a typical processor-based system, one or more processors 12, such as a microprocessor, control the processing of system functions and requests in the system 10. As is explained below, the processor 12 and other subcomponents of the system 10 may include memory devices manufactured in accordance with one or more embodiments of the present technique.

The system 10 typically includes a power supply 14. For instance, if the system 10 is a portable system, the power supply 14 may advantageously include a fuel cell, a power scavenging device, permanent batteries, replaceable batteries, and/or rechargeable batteries. The power supply 14 may also include an AC adapter, so the system 10 may be plugged into a wall outlet, for instance. The power supply 14 may also include a DC adapter such that the system 10 may be plugged into a vehicle cigarette lighter, for instance.

Various other devices may be coupled to the processor 12 depending on the functions that the system 10 performs. For instance, an input device 16 may be coupled to the processor 12. The input device 16 may include buttons, switches, a keyboard, a light pen, a mouse, a digitizer and stylus, and/or a voice recognition system, for instance. A display 18 may also be coupled to the processor 12. The input device 16 and/or the display 18 may each or both form a user interface. The display 18 may include an LCD, an SED display, a CRT display, a DLP display, a plasma display, an OLED display, LEDs, and/or an audio display, for example. Furthermore, an RF sub-system/baseband processor 20 may also be coupled to the processor 12. The RF sub-system/baseband processor 20 may include an antenna that is coupled to an RF receiver and to an RF transmitter (not shown). One or more communication ports 22 may also be coupled to the processor 12. The communication port 22 may be adapted to be coupled to one or more peripheral devices 24 such as a modem, a printer, a computer, or to a network, such as a local area network, remote area network, intranet, or the Internet, for instance.

The processor 12 generally controls the system 10 by processing software programs stored in the memory. The software programs may include an operating system, database software, drafting software, word processing software, and/or video, photo, or sound editing software, for example. The memory is operably coupled to the processor 12 to store and facilitate execution of instructions to implement various programs. For instance, the processor 12 may be coupled to the system memory 26, which may include dynamic random access memory (DRAM), and/or synchronous dynamic random access memory (SDRAM). The system memory 26 may include volatile memory, non-volatile memory, or a combination thereof. The system memory 26 is typically large so that it can store dynamically loaded applications and data.

The processor 12 may also be coupled to non-volatile memory 28, which is not to suggest that system memory 26 is necessarily volatile. The non-volatile memory 28 may include read-only memory (ROM), such as an EPROM, resistive read-only memory (RROM), and/or flash memory to be used in conjunction with the system memory 26. The size of the ROM is typically selected to be just large enough to store any necessary operating system, application programs, and fixed data. Additionally, the non-volatile memory 28 may include a high capacity memory such as a tape or disk drive memory, such as a hybrid-drive including resistive memory or other types of non-volatile solid-state memory, for instance.

Some embodiments of the present technique involve communication between the processor 12 and components of the system memory 26. For example, the processor 12 may include a general purpose processor, a central processing unit, a processor core, an ASIC, a memory controller, and/or an ALU, for example, capable of sending and receiving signals from internal processors of memory devices in the system memory 26. Components of the system 10 involved in the communication between the processor 12 and the components of the system memory 26 may be generally referred to as a "memory system" 30, as illustrated in the block diagram of FIG. 2. In some embodiments, a memory system 30 may include a memory device 34, which may be part of the system memory 26 of the system 10 (as in FIG. 1) and may have an internal processor. The memory system 30 may also include an external processor 32, which may be in a system-on-a-chip (SOC) with a more general purpose processor to collectively form a processor 12 of a processor-controlled system 10 (as in FIG. 1). The external processor 32, which may also be an external memory controller, may communicate with and/or control certain components of a memory device 34.

Figure 2:
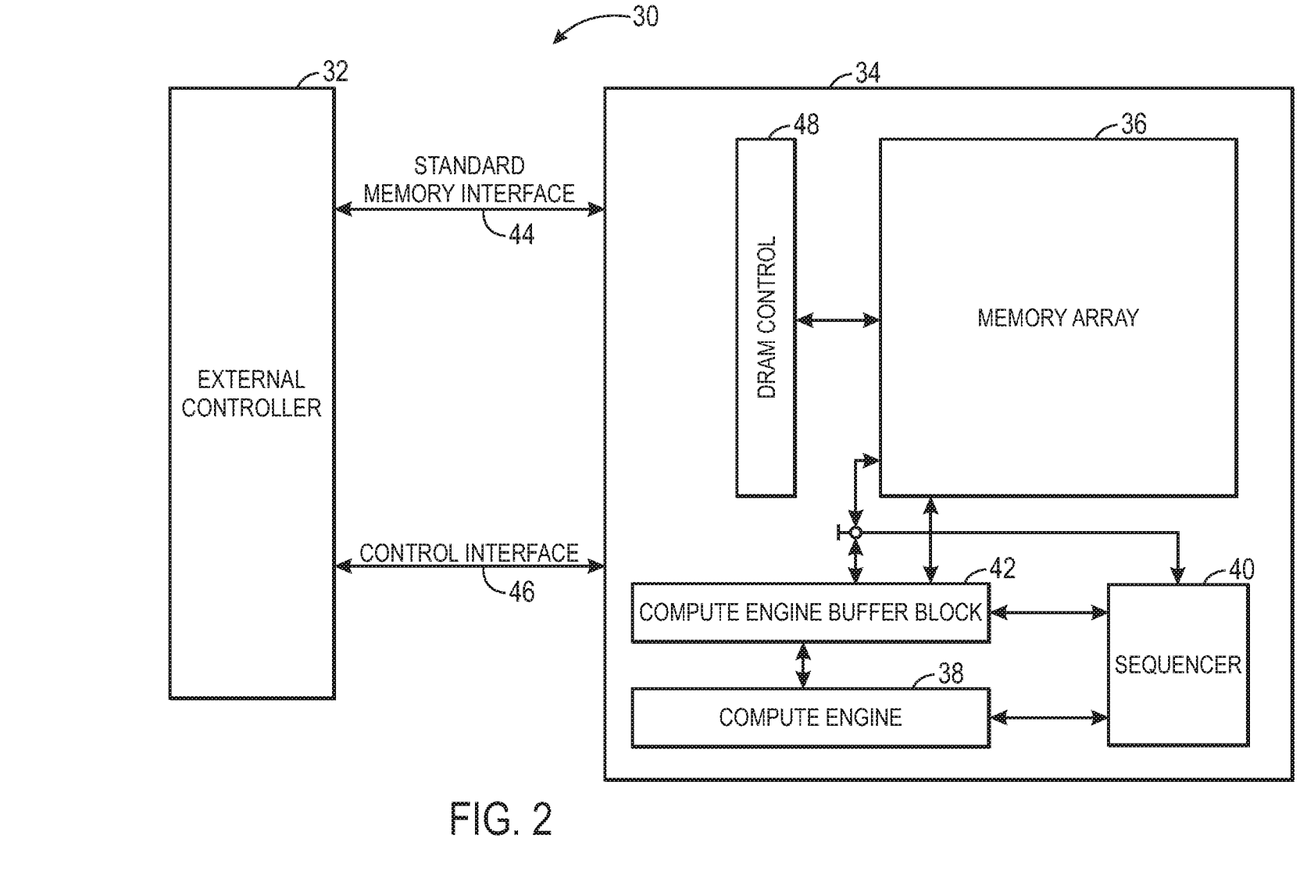
FIG. 2 depicts a block diagram of a memory system with embedded arithmetic logic units interfaced with an external memory controller, in accordance with an embodiment of the present technique.

The memory system 30 may include components which have functions that are not limited to the communication between the external processor 32 and the memory device 32. For example, the external processor 32 may control devices in addition to the memory device 34. However, the external processor 32, as explained with respect to the memory system 30, may refer to one function of the external processor 32 which communicates with and/or controls certain components of the memory device 34. Likewise, not all parts of the system memory 26 may be part of the memory system 30. The "memory device" 34 may refer to components of the system memory 26 involved in the communication with the external processor 32, in accordance with the present techniques.

The external processor 32 and the memory device 34 may be operably coupled by a standard memory interface 44 (e.g., DDR, DDR2, DDR3, LPDDR, or LPDDR2), which may allow data transfer between the external processor 32 and the memory device 34, and may allow the external processor 32 to send (e.g., transfer) commands to the memory device 34. In one or more embodiments, the types of standard memory interface 44 may include DDR, DDR2, DDR3, LPDDR, or LPDDR2, for example. Further, in some embodiments, an additional interface(s) may be configured to allow the transfer of data, and also commands (e.g., requests, grants, instructions, etc.), between the memory device 34 and the external processor 32. For example, the external processor 32 and the memory device 34 may also be operably coupled by a control interface 46, which may allow the transfer of commands between the external processor 32 and the memory device 34, including commands from the memory device 34 to the external processor 32.

The memory device 34 may include a compute engine 38 and a memory array 36. The memory array 36 may refer to any suitable form of storage, and may include, for example, a DRAM array or an SDRAM array. The memory controller 32 may have access to the memory array 36, and may be able to write data or instructions to be executed by the compute engine 38. The compute engine 38 may include one or more arithmetic logic units (ALUs).

The compute engine 38 may be embedded on the memory device 34 and capable of accessing the memory array 36, including retrieving information from, and storing information in the memory array 36. The process of retrieving and storing information between the compute engine 38 and the memory array 36 may involve a sequencer 40 and compute engine buffer block 42. The sequencer 40 may sequence the instructions sent by the controller 32 to the memory array 36 and store the data retrieved from the memory array 36 in a memory component such as the compute engine buffer block 42. Once the compute engine 38 has executed the instructions, the results may be stored in the compute engine buffer block 42 before they are written to the memory array 36. Further, as some instructions may require more than one clock cycle in the compute engine, intermediate results may also be stored in memory components in the memory device 34. For example, intermediate results may be stored in memory components such as the compute engine buffer block 42, other buffers, or registers coupled to the compute engine 38. In some embodiments, the compute engine buffer block 42 may include more than one layer of buffers. For example, the buffer block 42 may include a compute buffer, which may store operands, and an instruction buffer, which may store instructions. The buffer block 42 may also include additional buffers, such as a data buffer or a simple buffer, which may provide denser storage, and may store intermediate or final results of executed instructions. As used herein, "buffer 42" may refer to any layer (e.g., a compute buffer, instruction buffer, data buffer, etc.) in the compute engine buffer block 42.

Figure 3:
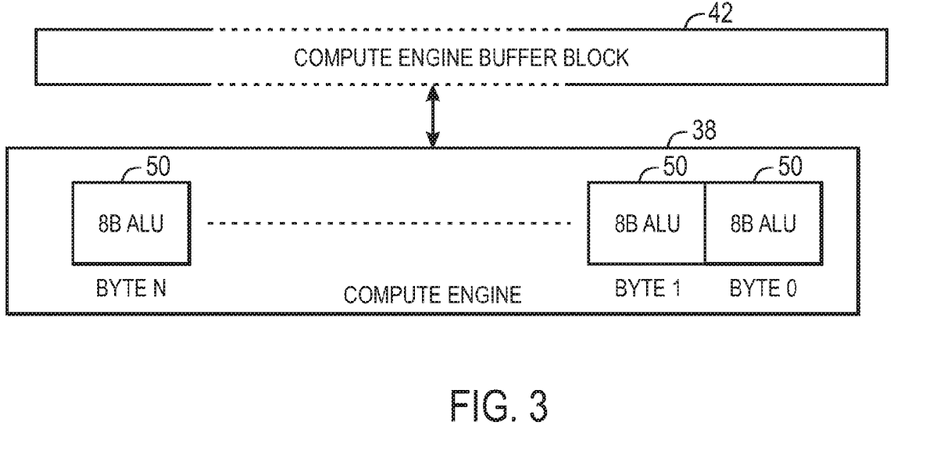
FIG. 3 depicts a block diagram of a compute buffer and a compute engine comprising ALUs embedded on a memory device, in accordance with one or more embodiments of the present technique.

In a typical memory system 30, an external processor 32 may store data and instructions in the memory array 36 on the memory device 34. A sequencer 40 may access the memory array 36 to retrieve the instructions, and may copy the data from the memory array 36 to the buffer 42. The block diagram of FIG. 3 illustrates a compute engine 38 having a plurality of ALUs 50, and may be connected to the buffer 42. In one embodiment, the buffer 42 may be configured such that data may be written to and read from storage elements in the buffer 42 to allow savings in the number of compute cycles of the compute engine 38. Further, the compute engine 38 may be configured such that each ALU 50 may operate on one operand at a time. As will be further discussed with reference to FIG. 6, each ALU 50 in the compute engine 38 may operate on an operand, and multiple operands may be operated on in parallel to increase the efficiency of the compute engine 38.

Figure 4:
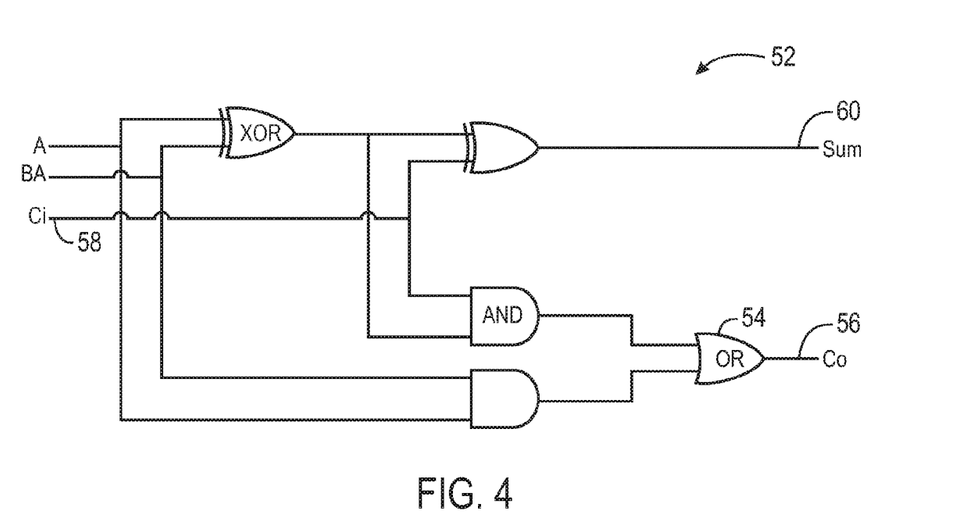
FIG. 4 illustrates a basic adder in a typical ALU.

An ALU 50 may operate on any size operand, and depending on the size of the operand, the operation may be performed through one or more cycles through an ALU 50. A basic building block of an ALU 50, a full adder 52, is depicted in the diagram of FIG. 4. Operands A and B may enter through the logic gates of the full adder 52. In some embodiments, the OR gate 54 may instead be an XOR gate. In some operations, the operands A and B may pass through one cycle of the full adder 52, and may be output through the carry-out output 56 to re-enter the full adder 52 through the carry-in input 58. The sum output 60 may output the completed operation (e.g., a summing operation) of the operands A and B. The full adder 52 may be capable of performing mathematical operations, such as addition, subtraction, and multiplication.

Figure 5:
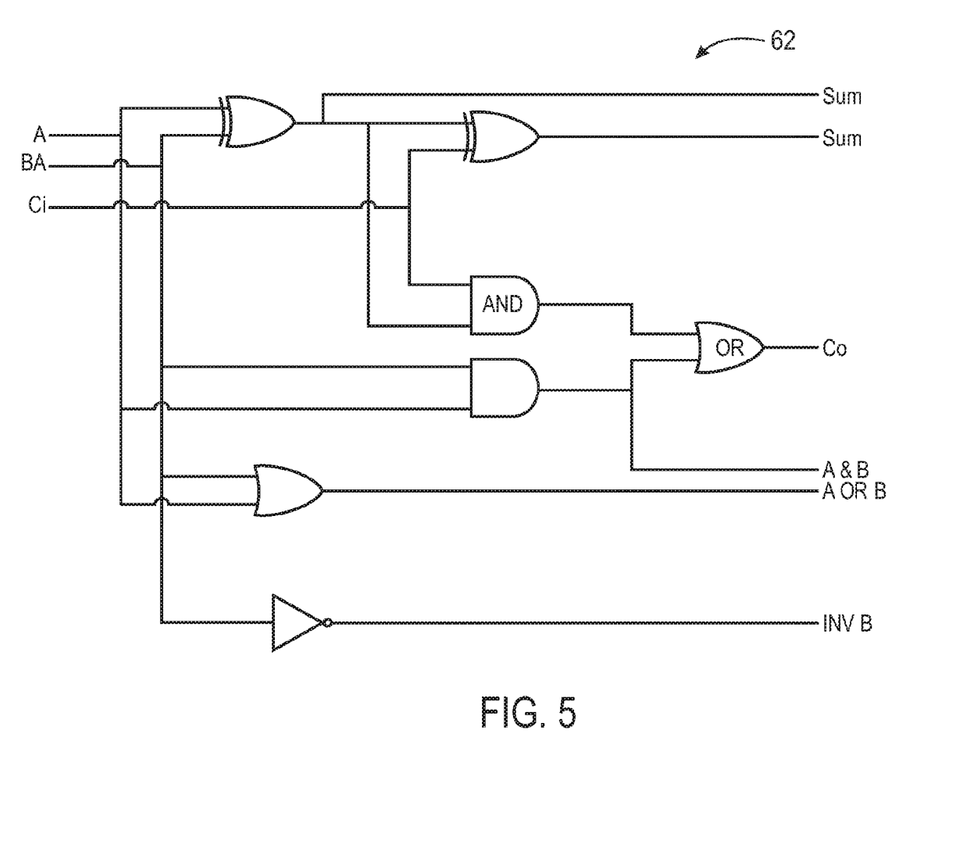
FIG. 5 illustrates an adder with logic gates for mathematical operations in a 1 byte ALU.

The capabilities of a full adder 52 may be increased by adding additional logic gates, as depicted in the diagram of FIG. 5. In some embodiments, the additional logic gates may allow the ALU, and the compute engine, to perform a more complicated set of instructions without significantly adding to the size of the ALU, or the size of the compute engine. Adding gates to the full adder may form a 1 bit (1 b) ALU 62. Multiple 1 b ALUs may be connected to form the ALU circuitry of the compute engine 38. For example, in one embodiment, eight 1 b ALUs may be placed in parallel to form an 8 bit (8 b) ALU. In other embodiments, the compute engine 38 may comprise any number of ALUs, which may be connected in different ways, in accordance with the present techniques. Further, a compute engine 38 may comprise any number of 8 b ALUs or different arrangements of 1 b ALUs 62.

Figure 6A:
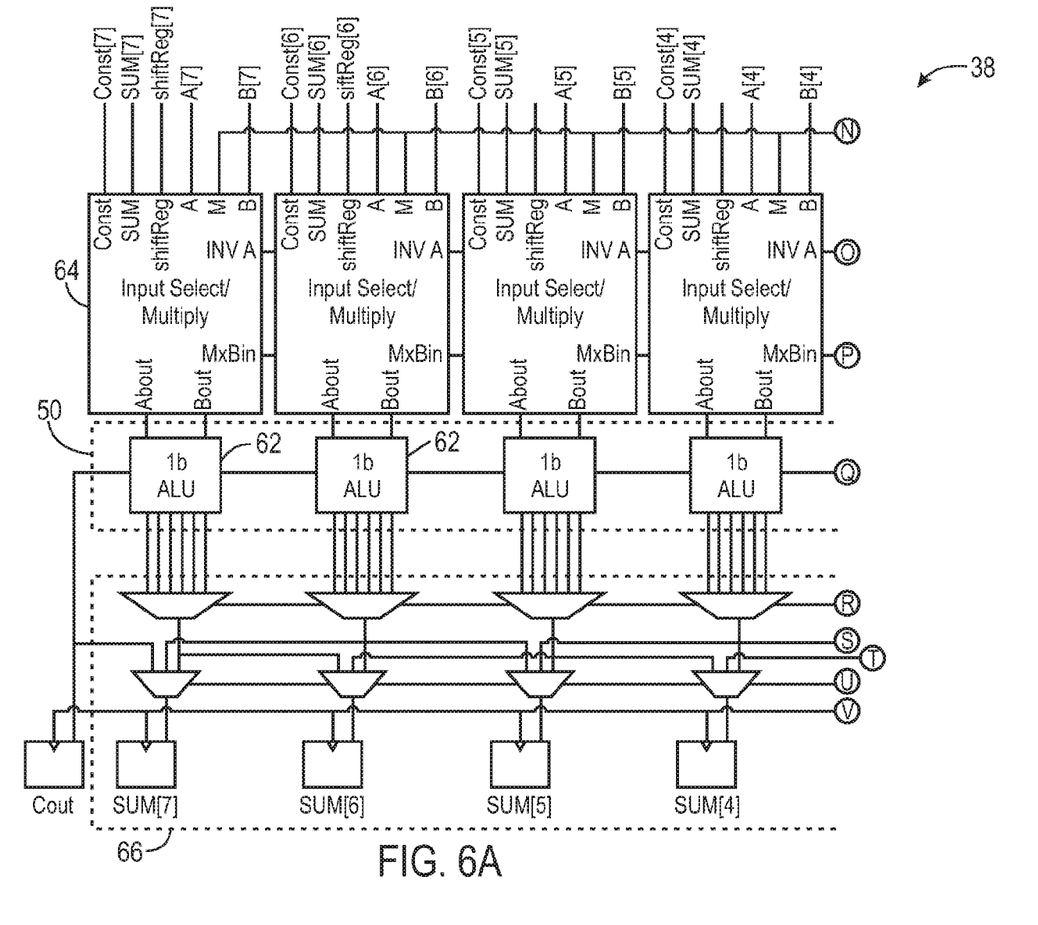
FIG. 6 depicts part of a compute engine having a 1 byte ALU, in accordance with one or more embodiments of the present technique.
Figure 6B:
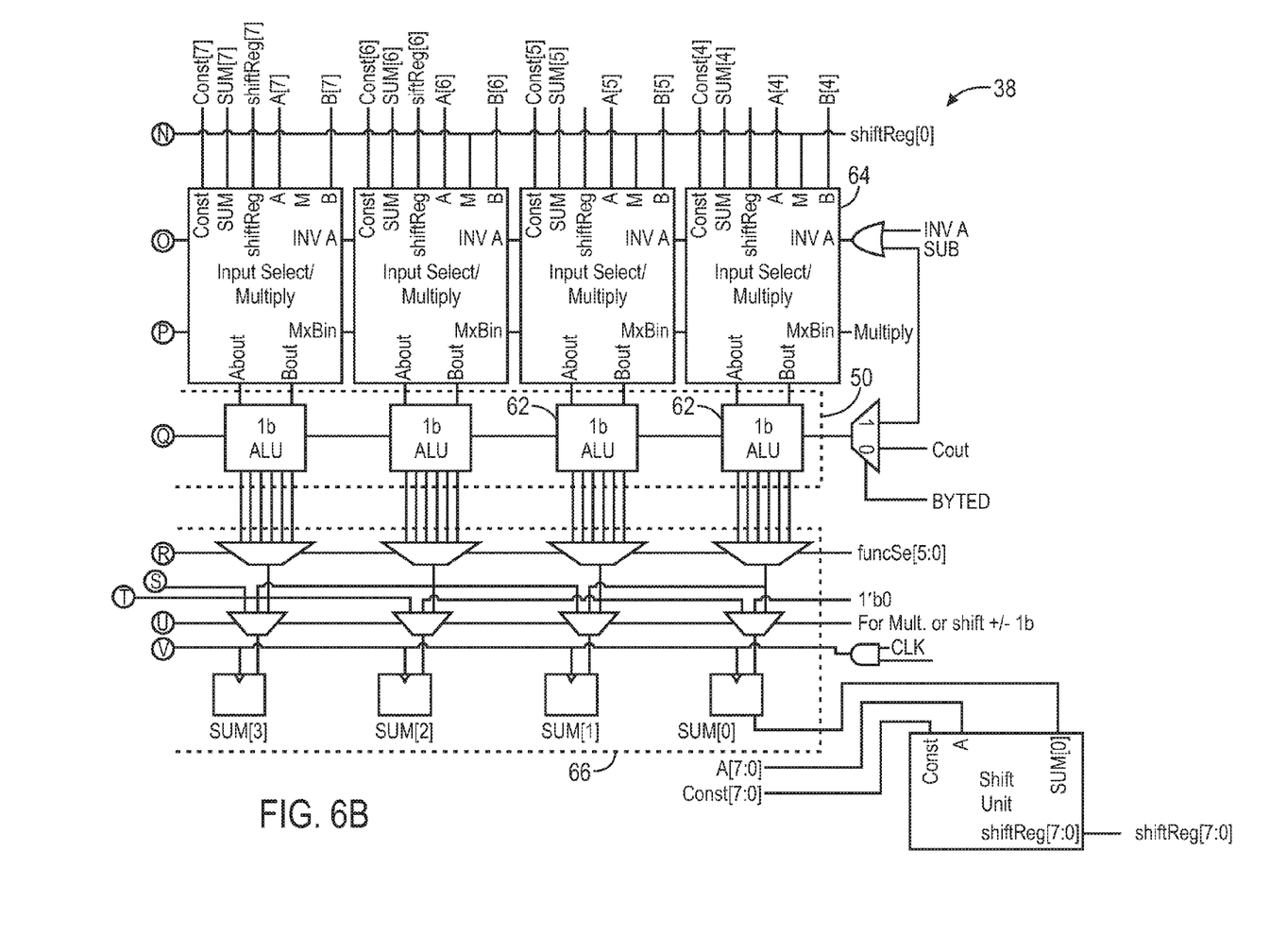
Figure 7:
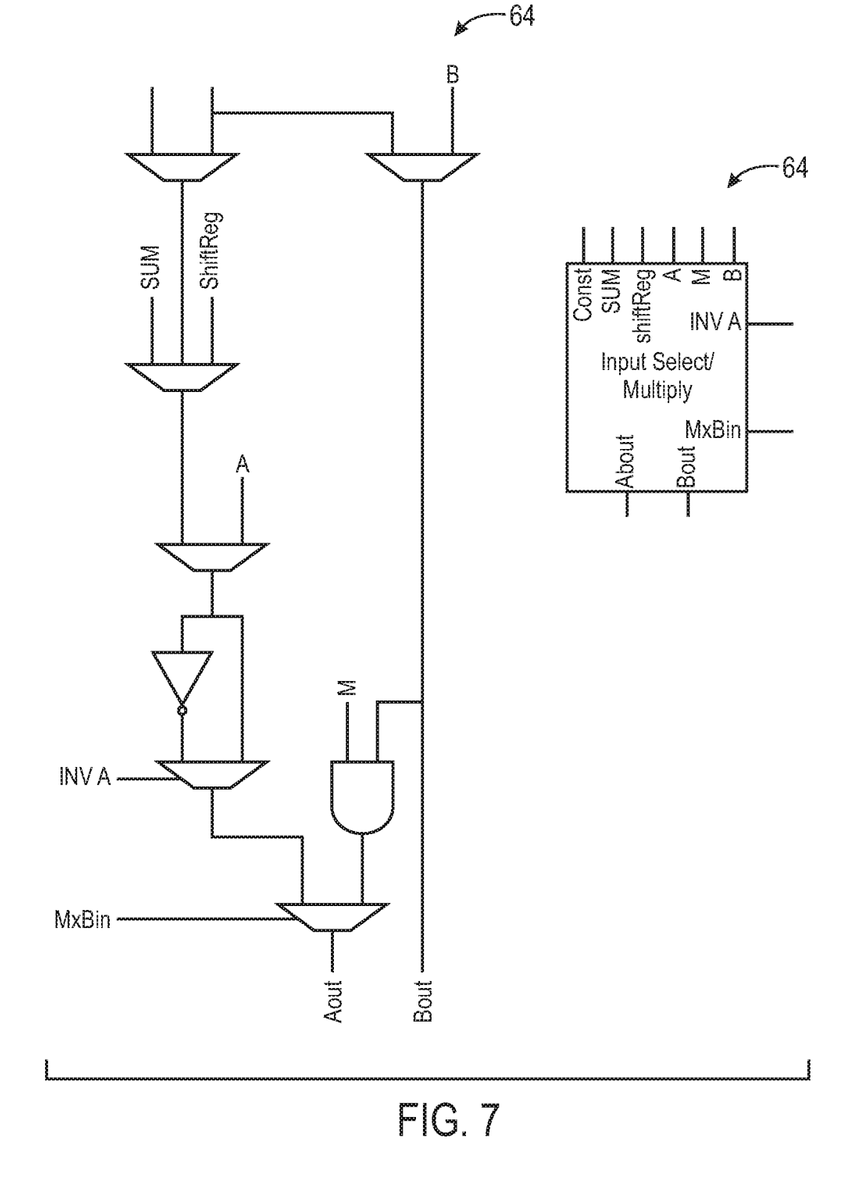
FIG. 7 depicts a block diagram of an input component for a 1 byte ALU, in accordance with one or more embodiments of the present technique.

The diagram of FIG. 6 depicts one embodiment of an 8 b (i.e., single byte) ALU 50 in a portion of a compute engine 38. The 8 b ALU 50 is configured to receive operands from a memory component such as the buffer block 42, and configured to operate on the received operands in parallel. Data may be input to each 1 b ALU 62 of an 8 b ALU 50 through an input multiplexer 64. In some embodiments, the sequencer 40 (FIG. 2) may select the data to be written to each 1 b ALU 62, from five different inputs of the input mux 64, including constant register (labeled "const [0-7]"), array A ("A [0-7]"), array B ("B [0-7]"), shift register ("shiftReg [0-7]"), and sum register ("SUM [0-7]"). For some operations, operands may cycle through one or more 1 b ALUs 62 more than once, and the outputs of one cycle through a 1 b ALU 62, which could be an intermediate result, may be carried in as an input for another 1 b ALU 62 in the 8 b ALU 50. Thus, the constant register may be input into one 1 b ALU 62 from one cycle through another 1 b ALU 62, for example, a summing operation from another 1 b ALU 62. The arrays A and B may be input from different parts of the memory array 36. In some embodiments, the memory array may include banks A and B, which may be connected to one another, configured around the compute engine buffer block 42, or otherwise configured on the memory device 34. Further, intermediate results of operations may also be input to the input mux 64 through the sum register and shift register inputs. For example, in one embodiment, intermediate results may be output from the 1 b ALUs 62 and stored in the sum register or the shift register until they are input back into the input mux 64. A more detailed diagram illustrating the circuitry in one embodiment of the input mux 64 is provided in FIG. 7. The input mux 64, as depicted in FIG. 6, is presented beside the detailed circuitry of the input mux 64 for comparison purposes. The circuitry of the input mux 64 may include logic gates and multiplexers, configured as illustrated.

The number of clock cycles through an ALU 50 to perform an operation on an operand may be based on the operation and the size of the operand to be operated on. For example, if the ALU 50 is 8 bits wide, and the operand size is 8 bits or less, the ALU 50 may receive operand A and operand B through the input, and may perform a logical operation on the operands in a single clock cycle. In some embodiments, the number of cycles needed to complete an operation on the operands may be based on the bit size of the operand, divided by the bit size of the ALU. If the operand size is greater than 8 bits, an 8 b ALU 50 may perform the operation on the first byte of the operands A and B. Once the first byte has been completed, the ALU may accept the next bits to perform the operation on a second byte.

Figure 8:
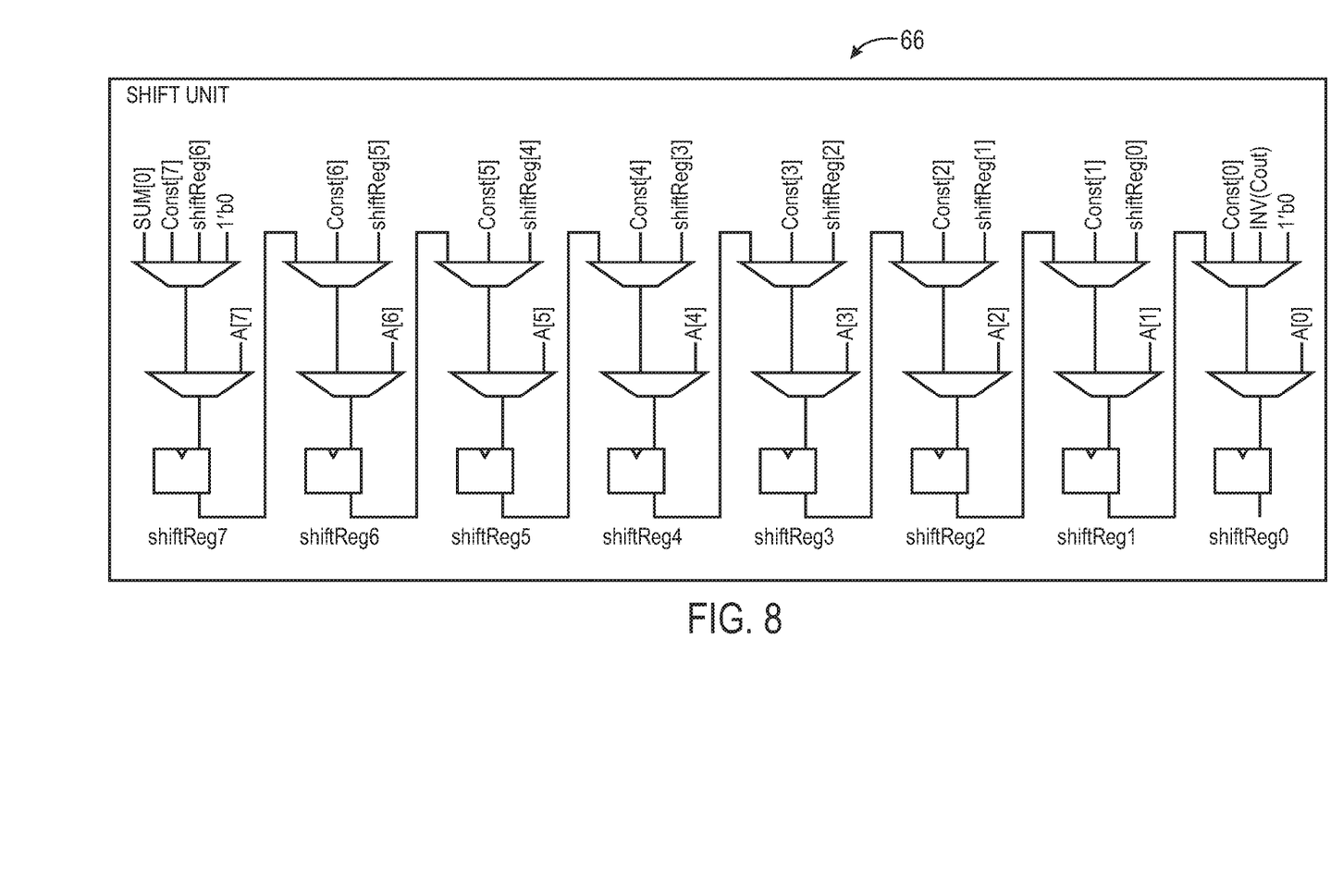
FIG. 8 depicts a block diagram of a shift unit used for shifting data between ALUs in an 8 bit ALU, in accordance with one or more embodiments of the present technique.

Some operations, for example, multiplication operations, may require multiple cycles to complete, even when an operand is 8 bits or less. In operations which are executed through multiple cycles, an output of one cycle through a 1 b ALU 62 may be an input into another 1 b ALU 62 in the same 8 b ALU 50. For example, each 8 b ALU may have a shift unit 66 which may shift the results of a multiply operation to the left from SUM[0]. As seen in the diagram of a shift unit 66 in FIG. 8, when two 8 b operands are multiplied together with an 8 b ALU 50, the lower byte of the results may be formed in the shift registers, while the upper byte of the results may be formed in the sum registers. As illustrated in both FIG. 8 and FIG. 6, the shift unit 66 may comprise a plurality of multiplexers and flip flops to shift results from one 1 b ALU 62 to another in the 8 b ALU 50.

The use of the shift unit 66 in the 8 b ALU 50 may be seen in a multiple cycle operation like a multiplication operation. In operations where the operands are smaller, a shift register may be sufficient to output the intermediate results to the input of the input mux 64. In operations where the operands are larger, the buffer 42 may be used to store intermediate results before the intermediate results are input to the input of the input mux 64.

Table 1 below provides one example, illustrating the multiplication of two 8 bit operands B×A to produce a 16 bit result.

TABLE 1

|  |  |  |  |  |  |  |  |  |  |  |  |  |  |  |  |  |  |
|---|---|---|---|---|---|---|---|---|---|---|---|---|---|---|---|---|---|
|  | B |  |  |  |  |  |  |  | 0 | 0 | 1 | 1 | 0 | 1 | 1 | 0 |
| × | A |  |  |  |  |  |  |  | 1 | 1 | 0 | 0 | 1 | 0 | 0 | 1 |
|  | C |  |  |  |  |  |  |  | 0 | 0 | 1 | 1 | 0 | 1 | 1 | 0 |
|  |  |  |  |  |  |  |  | 0 | 0 | 0 | 0 | 0 | 0 | 0 | 0 |  |
|  |  |  |  |  |  |  | 0 | 0 | 0 | 0 | 0 | 0 | 0 | 0 |  |  |
|  |  |  |  |  |  | 0 | 0 | 1 | 1 | 0 | 1 | 1 | 0 |  |  |  |
|  |  |  |  |  | 0 | 0 | 0 | 0 | 0 | 0 | 0 | 0 |  |  |  |  |
|  |  |  |  | 0 | 0 | 0 | 0 | 0 | 0 | 0 | 0 |  |  |  |  |  |
|  |  |  | 0 | 0 | 1 | 1 | 0 | 1 | 1 | 0 |  |  |  |  |  |  |
|  | 0 | 0 | 0 | 1 | 1 | 0 | 1 | 1 | 0 |  |  |  |  |  |  |  |
| Result | 0 | 0 | 1 | 0 | 1 | 0 | 1 | 0 | 0 | 1 | 1 | 0 | 0 | 1 | 1 | 0 |
| Bit Number: | 15 | 14 | 13 | 12 | 11 | 10 | 9 | 8 | 7 | 6 | 5 | 4 | 3 | 2 | 1 | 0 |

The result, in the row marked "Result," includes two 8 b bytes, and the byte from bit numbers 0 to 7 may be the least significant byte, which may be stored in the shift register of the 8 b ALU 50. The byte from bit numbers 8 to 15 may be the most significant byte, which may be stored in the sum register of the 8 b ALU 50.

Table 2 provides the operation of each clock cycle of the same multiplication of 8 b operands A and B, and the bytes stored in the sum register and shift register at each cycle.

TABLE 2

| clock Cycle: | Carry | Sum Reg | ShiftReg | Operation: |
|---|---|---|---|---|
| 0 | 0 | 8'b00000000 | 8'b11001001 | Copy multiplier (A) in to shiftReg, set SUM and Carry registers to 0 |
| 1 | 0 | 8'b00011011 | 8'b01100100 | if(shiftReg[0]==1) SUM = SUM + multiplicand (B) ELSE SUM = SUM; shift {Carry,SUM, shiftReg} 1bit right |
| 2 | 0 | 8'b00001101 | 8'b10110010 | if(shiftReg[0]==1) SUM = SUM + multiplicand (B) ELSE SUM = SUM; shift {Carry,SUM, shiftReg} 1bit right |
| 3 | 0 | 8'b00000110 | 8'b11011001 | if(shiftReg[0]==1) SUM = SUM + multiplicand (B) ELSE SUM = SUM; shift {Carry,SUM, shiftReg} 1bit right |
| 4 | 0 | 8'b00011110 | 8'b01101100 | if(shiftReg[0]==1) SUM = SUM + multiplicand (B) ELSE SUM = SUM; shift {Carry,SUM, shiftReg} 1bit right |
| 5 | 0 | 8'b00001111 | 8'b00110110 | if(shiftReg[0]==1) SUM = SUM + multiplicand (B) ELSE SUM = SUM; shift {Carry,SUM, shiftReg} 1bit right |
| 6 | 0 | 8'b00000111 | 8'b10011011 | if(shiftReg[0]==1) SUM = SUM + multiplicand (B) ELSE SUM = SUM; shift {Carry,SUM, shiftReg} 1bit right |
| 7 | 0 | 8'b00011110 | 8'b11001101 | if(shiftReg[0]==1) SUM = SUM + multiplicand (B) ELSE SUM = SUM; shift {Carry,SUM, shiftReg} 1bit right |

TABLE 2-continued

| clock Cycle: | Carry | Sum Reg | ShiftReg | Operation: |
|---|---|---|---|---|
| 8 | 0 | 8'b00101010 | 8'b01100110 | if(shiftReg[0]==1) SUM = SUM + multiplicand (B) ELSE SUM = SUM; shift {Carry,SUM, shiftReg} 1bit right |

As seen in Table 2, the sum register is initially set to 0 in clock cycle [0]. At each clock cycle, the least significant bit of the shift register determines whether the 8 b ALU 50 will add the multiplicand or zero to the intermediate result. Further, after the addition operation is performed on each cycle, the concatenation of the bits in the carry-out, sum register, and shift register are shifted to the right by one bit. After the eight cycle, all 8 bits of the multiplier may have been evaluated as a 0 or a 1, and all addition operations have completed. The compute engine 38 (FIG. 2) may then write the lower byte contained in the shift register (least significant byte) into the buffer 42. On the next cycle, the compute engine may write the upper byte contained in the sum register (most significant byte) to the buffer 42.

An example of the multiplication of two 16 b operands, producing a 32 b result, may be provided in Table 3, showing the long hand format of the multiplication.

TABLE 3

```
                                                                  B
                                                              ×   A
                                                                                              0
                                                                                            0 0
                                                                                          1 0 0
                                                                                        0 0 0 0
                                                                                      0 0 0 0 0
                                                                                    1 0 0 1 0 1
                                                                                  1 0 0 1 0 1 1
                                                                                0 0 0 0 0 0 0 0
                                                                              1 0 0 1 0 1 1 1 0
                                                                            0 0 0 0 0 0 0 0 0 0
                                                                          1 0 0 1 0 1 1 1 0 0 1
                                                                        1 0 0 1 0 1 1 1 0 0 1 1
                                                                      1 0 0 1 0 1 1 1 0 0 1 1 0
                                                                    0 0 0 0 0 0 0 0 0 0 0 0 0 0
                                                                  0 0 0 0 0 0 0 0 0 0 0 0 0 0 0
                                                        Result    0 1 0 0 0 1 0 1 0 1 1 1 0 0 0
                                                        Bit      31 30 29 28 27 26 25 24 23 22 21 20 19 18 17 #
                                                        Number:

1 0 0 1 0 1 1 1 0 0 1 1 0 1 1 0
                                                                  0 0 1 1 1 0 1 0 1 1 0 0 1 0 0 1
                                                                  1 0 0 1 0 1 1 1 0 0 1 1 0 1 1 0
                                                                  0 0 0 0 0 0 0 0 0 0 0 0 0 0
                                                                  0 0 0 0 0 0 0 0 0 0 0 0 0
                                                                  1 0 1 1 1 0 0 1 1 0 1 1 0
                                                                  0 0 0 0 0 0 0 0 0 0 0
                                                                  0 0 0 0 0 0 0 0 0 0
                                                                  1 1 0 0 1 1 0 1 1 0
                                                                  1 0 0 1 1 0 1 1 0
                                                                  0 0 0 0 0 0 0 0
                                                                  0 1 1 0 1 1 0
                                                                  0 0 0 0 0
                                                                  1 0 1 1 0
                                                                  0 1 1 0
                                                                  1 1 0
                                                                  0 0
                                                                  0
                                                        Result    1 1 1 1 0 1 0 1 0 1 1 0 0 1 1 0
                                                        Bit      15 14 13 12 11 10 9 8 7 6 5 4 3 2 1 0
                                                        Number:
```

In some embodiments, the ALU may operate on byte wide boundaries, and the compute engine may store intermediate results in a buffer 42. For example, an 8 b ALU 50 may be bound by one byte (or 8 bits), and may not be able to process more than 8 bits at once. As may be seen in Table 3, when multiplying operands greater than 8 bits, the compute engine 38 may repeat the 8 b multiply operation n times, where n is the number of bytes of the multiplier times the number of bytes in the multiplicand. For example, the multiplication of a 16 b multiplier by a 16 b multiplicand may take 4 (2 bytes times 2 bytes) 8 b multiplications. As the 8 b ALU 50 is limited by the one byte boundary, the 8 b ALU 50 may perform 4 8 b multiplication operations, and the intermediate results of these operations may be stored in the buffer 42, or in some other memory component.

Tables 4-7 below, and the corresponding descriptions, may describe the multiplication of the 16 b×16 b operands in more detail. As seen in Table 4 below, the first bytes of the operands (bordered in bold) may be the most significant bytes. The lower bytes of the operands (normal border) may be the least significant bytes, and the multiplication of the least significant bytes may take eight cycles.

TABLE 4

| | B | 1 | 0 | 0 | 1 | 0 | 1 | 1 | 1 | 0 | 0 | 1 | 1 | 0 | 1 | 1 | 0 | | | | | | | | |
|---|---|---|---|---|---|---|---|---|---|---|---|---|---|---|---|---|---|---|---|---|---|---|---|---|
| x | A | 0 | 0 | 1 | 1 | 1 | 0 | 1 | 0 | 1 | 1 | 0 | 0 | 1 | 0 | 0 | 1 | 0 | 0 | 0 | 0 | 0 | 0 | 0 | 0 |
| | | | | | | | | | | | | | | | | | | 0 | 0 | 1 | 1 | 0 | 1 | 1 | 0 |
| | | | | | | | | | | | | | | | | | 0 | 0 | 0 | 0 | 0 | 0 | 0 | 0 | |
| | | | | | | | | | | | | | | | | 0 | 0 | 0 | 0 | 0 | 0 | 0 | 0 | | |
| | | | | | | | | | | | | | | | 0 | 0 | 1 | 1 | 0 | 1 | 1 | 0 | | | |
| | | | | | | | | | | | | | | 0 | 0 | 0 | 0 | 0 | 0 | 0 | 0 | | | | |
| | | | | | | | | | | | | | 0 | 0 | 0 | 0 | 0 | 0 | 0 | 0 | | | | | |
| | | | | | | | | | | | | 0 | 0 | 1 | 1 | 0 | 1 | 1 | 0 | | | | | | |
| | | | | | | | | | | | 0 | 0 | 0 | 1 | 1 | 0 | 1 | 1 | 0 | | | | | | |
| | | | | | | | | | | | 0 | 0 | 1 | 0 | 1 | 0 | 1 | 0 | 0 | 1 | 1 | 0 | 0 | 1 | 1 | 0 |
| | | | | | | | | | Bit Number: | 15 | 14 | 13 | 12 | 11 | 10 | 9 | 8 | 7 | 6 | 5 | 4 | 3 | 2 | 1 | 0 |

The compute engine 38 may set the sum register to zero in the initial cycle zero, as there are no intermediate results (e.g., partial products in a multiplication operation) to add yet. The compute engine 38 may then multiply the lower byte of the multiplier (operand A) by the lower byte of the multiplicand (operand B). Once the multiplication of the two least significant bytes is complete, the lower byte of the results may be found in the shift register. The most significant byte of this multiplication (bit numbers 8-15, bolded), may be intermediate results stored in the sum register, while the least significant byte of this multiplication (bit numbers 0-7) may be part of the final results, and may be written to the buffer 42.

The compute engine 38 may then shift or copy the sum registers from the previous step (bolded in Table 4) to the shift register for the second part of the 16 b×16 b multiplication operation, illustrated in Table 5.

TABLE 5

| | B | 1 | 0 | 0 | 1 | 0 | 1 | 1 | 1 | 0 | 0 | 1 | 1 | 0 | 1 | 1 | 0 | | | | | | | | |
|---|---|---|---|---|---|---|---|---|---|---|---|---|---|---|---|---|---|---|---|---|---|---|---|---|
| x | A | 0 | 0 | 1 | 1 | 1 | 0 | 1 | 0 | 1 | 1 | 0 | 0 | 1 | 0 | 0 | 1 | 0 | 0 | 1 | 0 | 1 | 0 | 1 | 0 |
| | | | | | | | | | | | | | | | | | | 1 | 0 | 0 | 1 | 0 | 1 | 1 | 1 |
| | | | | | | | | | | | | | | | | | 0 | 0 | 0 | 0 | 0 | 0 | 0 | 0 | |
| | | | | | | | | | | | | | | | | 0 | 0 | 0 | 0 | 0 | 0 | 0 | 0 | | |
| | | | | | | | | | | | | | | | 1 | 0 | 0 | 1 | 0 | 1 | 1 | 1 | | | |
| | | | | | | | | | | | | | | 0 | 0 | 0 | 0 | 0 | 0 | 0 | 0 | | | | |
| | | | | | | | | | | | | | 0 | 0 | 0 | 0 | 0 | 0 | 0 | 0 | | | | | |
| | | | | | | | | | | | | 1 | 0 | 0 | 1 | 0 | 1 | 1 | 1 | | | | | | |
| | | | | | | | | | | | 0 | 1 | 0 | 0 | 1 | 0 | 1 | 1 | 1 | | | | | | |
| | | | | | | | | | | | 0 | 1 | 1 | 1 | 0 | 1 | 1 | 0 | 1 | 0 | 1 | 1 | 0 | 0 | 1 |
| | | | | | | | | | Bit Number: | 15 | 14 | 13 | 12 | 11 | 10 | 9 | 8 | 7 | 6 | 5 | 4 | 3 | 2 | 1 | 0 |

The sum register of the first part of the operation in Table 4 may contain a partial product to be added to the second part of the operation in Table 5 (bolded, in the operand A row). As seen in Table 5, the most significant byte of the multiplicand (operand B) and the least significant byte of the multiplier (operand A), both with unshaded borders, are multiplied in long hand. After eight clock cycles for this multiplication step, the sum register and the shift register contain intermediate results. The sum register (bit numbers 8-15, bolded) is copied to the buffer 42 for use in a later step, and the shift register (bit numbers 0-7) is copied to the sum register for use in the third part of the multiplication process, as shown in Table 6.

The results of the multiplication are the final results for the most significant two bytes, and the second most significant byte of the result (bit numbers 0-7) is in the shift register while the most significant byte (bolded, bit numbers 8-15) is in the sum register. The shift register and the sum register are then copied to the buffer 42 with other results. In some embodiments, the final results stored in the buffer 42 may eventually be copied to the memory array 36.

In one embodiment, a compute engine 38 using the present techniques may also perform division operations using the restoring method of division. The restoring method of division may refer to the relationship of Quotient=Numerator/Denominator, and may operate on

TABLE 6

| B | 1 | 0 | 0 | 1 | 0 | 1 | 1 | 1 | 0 | 0 | 1 | 1 | 0 | 1 | 1 | 0 | | | | | | | | |
|---|---|---|---|---|---|---|---|---|---|---|---|---|---|---|---|---|---|---|---|---|---|---|---|---|
| x A | 0 | 0 | 1 | 1 | 1 | 0 | 1 | 0 | 1 | 1 | 0 | 0 | 1 | 0 | 0 | 1 | 1 | 0 | 1 | 1 | 1 | 0 | 0 | 1 |
| | | | | | | | | | | | | | | | | | 0 | 0 | 0 | 0 | 0 | 0 | 0 | 0 |
| | | | | | | | | | | | | | | | | | 0 | 0 | 1 | 1 | 0 | 1 | 1 | 0 |
| | | | | | | | | | | | | | | | 0 | 0 | 0 | 0 | 0 | 0 | 0 | 0 | | |
| | | | | | | | | | | | | | 0 | 0 | 1 | 1 | 0 | 1 | 1 | 0 | | | | |
| | | | | | | | | | | | | 0 | 0 | 1 | 1 | 0 | 1 | 1 | 0 | | | | | |
| | | | | | | | | | | | 0 | 0 | 1 | 1 | 0 | 1 | 1 | 0 | | | | | | |
| | | | | | | | | | | 0 | 0 | 0 | 0 | 0 | 0 | 0 | 0 | | | | | | | |
| | | | | | | | | 0 | 0 | 0 | 0 | 0 | 0 | 0 | 0 | | | | | | | | | |
| | | | | | | | | 0 | 0 | 0 | 0 | 1 | 1 | 0 | 0 | 1 | 1 | 1 | 1 | 0 | 1 | 0 | 1 |
| | | | | | | | Bit Number: | 15 | 14 | 13 | 12 | 11 | 10 | 9 | 8 | 7 | 6 | 5 | 4 | 3 | 2 | 1 | 0 |

In Table 6, the compute engine 38 may perform the 8 cycle multiplication process once the shift register of the previous results have been copied to the sum register. As shown by the boxes surrounded by the bolded border in Table 6, the least significant byte of the multiplicand (operand B) is multiplied by the most significant byte of the multiplier (operand A). The compute engine 38 may perform the 8 b multiplication, and once the third part of the multiplication operation is complete, the shift register may contain first byte (bolded, bit numbers 8 to 15) of the final results.

In the fourth step of the 16 b×16 b multiplication operation, the compute engine 38 may sum the results in the sum register from the third step (Table 6) with the intermediate results saved in the compute buffer during the second step (Table 5). In some embodiments, the result of this addition is left in the sum register (bolded, in the operand A row) to be added to the final multiplication. As seen in Table 7 below, the most significant byte of the multiplier (operand A) and the multiplicand (operand B), both with unshaded borders, are multiplied with the partial sum from the previous steps.

fixed-point fractional numbers based on the assumption that N<D; 0<N; and D<1. During a division operation, the denominator may be copied to the shift register, and the sum register may be set to zero. On each cycle of the division operation, the compute engine 38 may shift the shift register one bit into the sum register and subtract the numerator from the shifted sum register value. If the results are positive, then the carry-out value of the 1 b ALU 62 may be "0," and the compute engine 38 may set the shift register to "1" while the sum register will be the result of the subtraction. If the results are negative, the carry-out value of the 1 b ALU 62 may be "1," and the compute engine 38 may set the shift register to "0," and the sum register will be set to the shifted sum value prior to the subtraction.

The present techniques may also apply to division operations where operands greater than one byte are divided. In such operations, the compute engine 38 may start with the most significant byte (the last byte) of the denominator, and may perform the sequence as if it were only an 8 b division operation. The subtraction process in each cycle may take n cycles, and once the 8 b division of the most significant byte is complete, the compute engine 38 may store the shift

TABLE 7

| B | 1 | 0 | 0 | 1 | 0 | 1 | 1 | 1 | 0 | 0 | 1 | 1 | 0 | 1 | 1 | 0 | | | | | | | | |
|---|---|---|---|---|---|---|---|---|---|---|---|---|---|---|---|---|---|---|---|---|---|---|---|---|
| x A | 0 | 0 | 1 | 1 | 1 | 0 | 1 | 0 | 1 | 1 | 0 | 0 | 1 | 0 | 0 | 1 | 1 | 0 | 0 | 0 | 0 | 0 | 1 | 0 |
| | | | | | | | | | | | | | | | | | 0 | 0 | 0 | 0 | 0 | 0 | 0 | 0 |
| | | | | | | | | | | | | | | | | 1 | 0 | 0 | 1 | 0 | 1 | 1 | 1 | |
| | | | | | | | | | | | | | | | 0 | 0 | 0 | 0 | 0 | 0 | 0 | 0 | | |
| | | | | | | | | | | | | | | 1 | 0 | 0 | 1 | 0 | 1 | 1 | 1 | | | |
| | | | | | | | | | | | | | 1 | 0 | 0 | 1 | 0 | 1 | 1 | 1 | | | | |
| | | | | | | | | | | | | 1 | 0 | 0 | 1 | 0 | 1 | 1 | 1 | | | | | |
| | | | | | | | | | | | 0 | 0 | 0 | 0 | 0 | 0 | 0 | 0 | | | | | | |
| | | | | | | | | | 0 | 0 | 0 | 0 | 0 | 0 | 0 | 0 | | | | | | | | |
| | | | | | | | | 0 | 0 | 1 | 0 | 0 | 0 | 1 | 0 | 1 | 0 | 1 | 1 | 1 | 0 | 0 | 0 |
| | | | | | | | Bit Number: | 15 | 14 | 13 | 12 | 11 | 10 | 9 | 8 | 7 | 6 | 5 | 4 | 3 | 2 | 1 | 0 | register or the quotient of the operation in the buffer 42 at a designated address. The compute engine 38 may then perform the 8 b division operation using the shifted most significant byte, and may continue the process until the least significant byte of the denominator has been divided. Thus, as for the multiplication operation previously discussed, the number of cycles taken to complete a division operation may also depend on the number of bytes in the operands to be divided.

The 8 b ALU 50 may also be used to perform addition operations on operands of any size. When operands are 8 bits or less, the 8 b ALU 50 may add operand A to operand B, and the addition operation may take one cycle. The results may be stored in the sum register and the carry-out register of the 8 b ALU 50, and in the following cycle of the next operand, the result may be stored into the buffer 42 at a designated address.

When an addition operation is to be performed on operands larger than 8 bits, the compute engine 38 may perform the addition one byte at a time, or one byte per clock cycle. When performing the operation with an 8 b ALU 50, performing the addition operation one byte at a time may mean adding the operands 8 bits at a time. For cycle 0, the least significant byte may be added, and for cycle 1, the least significant byte+1 is added, and the carry-out of cycle 0 may be used as the carry-in for cycle 1. After adding each byte, the results may be stored in the buffer 42 at a designated address. The process may be repeated until all bytes of the operands have been added.

An 8 b ALU 50 may also be used to perform subtraction operations on operands of any size. For operands that are 8 b or less, the compute engine 38 may subtract operand B from operand A. The subtraction operation may take one cycle, and the results may be stored in the sum registers and the carry-out register. The compute engine 38 may store the results to the buffer 42 at a destination address in a next cycle of the 8 b ALU 50.

When a subtraction operand is to be performed on operands large than 8 bits, the compute engine 38 may perform the subtraction operation one byte at a time, or one byte per clock cycle. For cycle 0, the least significant byte may be subtracted, and for cycle 1, the least significant byte+1 is subtracted, and the carry-out of cycle 0 may be used as the carry-in for cycle 1. After subtracting each byte, the results may be stored in the buffer 42 at a designated address. The process may be repeated until all bytes of the operands have been subtracted.

While the present disclosure provides examples of mathematical operations executed by an 8 b ALU 50, an ALU of a different size may also be used. An ALU in may be composed of building blocks (e.g., adders, or 1 b ALUs) which may enable the ALU to perform logic or mathematical operations on operands of any size. For operands that have a byte width greater than the size of the ALU, the compute engine 38 may operate on a byte of each operand at a time and store the results of each cycle of the operation in the compute buffer.

Furthermore, while the present disclosure provides examples of mathematical operations such as multiplication, division, addition, and subtraction, other operations may also be performed by the compute engine 38. The possible operations which may be performed by each 8 b ALU 50, or by the compute engine, are not limited by the gates or structure of each 1 b ALU 62. For example, there may be no explicit NAND functionality in the 1 b ALU of FIG. 5. However, if the compute engine 38 is instructed to perform A NAND B, operands A and B may first be cycled through the 1 b ALU as A AND B, and the results of that may be carried back in, and INV B may be selected on the second cycle to obtain results for A NAND B.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A system comprising:
a memory device comprising:
a plurality of internal processors each having a 1 bit width and configured to operate in parallel;
a first larger internal processor comprising a first eight internal processors of the plurality of internal processors, wherein, to perform a multiplication operation on a first operand larger than a byte width of the first larger internal processor, the first larger internal processor is configured to:
receive a first portion of the first operand, wherein the first portion of the first operand comprises a first size;
perform the multiplication operation on the first portion of the first operand to determine a first intermediate result, wherein the first intermediate result comprises a second size equal to the first size;
receive a second portion of the first operand and the first intermediate result; and
perform the multiplication operation on the second portion of the first operand based at least in part on the first intermediate result to determine a first final result of the multiplication operation; and
a memory component configured to hold the first operand, the first intermediate result, and the first final result;
wherein, to perform the multiplication operation, the first larger internal processor is configured to:
receive an instruction instructing the first larger internal processor to perform a 16-bit multiplication operation on the first operand and a second operand, wherein functionality to perform the 16-bit multiplication operation is not explicitly provided in the first eight internal processors;
perform a first 8-bit multiplication operation on a first 8-bit portion of the first operand and a second 8-bit portion of the second operand to determine a first 8-bit intermediate result and a first 8-bit portion of a 32-bit final result;
perform a second 8-bit multiplication operation on the first 8-bit portion of the first operand and a third 8-bit portion of the second operand based at least in part on the first 8-bit intermediate result to determine a second 8-bit intermediate result and a third 8-bit intermediate result;
perform a third 8-bit multiplication operation on a fourth 8-bit portion of the first operand and the second 8-bit portion of the second operand based at least in part on the second 8-bit intermediate result to determine a fourth 8-bit intermediate result and a second 8-bit portion of the 32-bit final result, and perform a fourth 8-bit multiplication operation on the fourth 8-bit portion of the first operand and the third 8-bit portion of the second operand based at least in part on the third 8-bit intermediate result and the fourth 8-bit intermediate result to determine a 16-bit portion of the 32-bit final result.

2. The system, as set forth in claim 1, comprising an external processor communicatively coupled to the memory device, wherein the external processor is configured to provide the instruction instructing the first larger internal processor to perform the multiplication operation on the first operand.

3. The system, as set forth in claim 1, wherein the memory device comprises a second larger internal processor comprising a second eight internal processors of the plurality of internal processors, wherein the second larger internal processor is configured to:
receive an instruction instructing the second larger internal processor to perform a NAND operation on a third operand and a fourth operand in parallel with the multiplication operation, wherein functionality to perform the NAND operation is not explicitly provided in the first eight internal processors;
perform an AND operation on the third operand and the fourth operand to determine a second intermediate result during a first cycle; and
perform an INV operation on the second intermediate result to determine a final result of the NAND operation.

4. The system, as set forth in claim 1, wherein the first larger internal processor is configured to:
perform the multiplication operation on the first portion of the first operand during a first eight cycles; and
perform the multiplication operation on the second portion of the first operand during a second eight cycles after the first eight cycles.

5. The system, as set forth in claim 1, wherein the memory component comprises:
a buffer configured to hold the first operand;
a memory register configured to hold the first intermediate result; and
an input multiplexer configured to select between inputting a portion of the first operand and inputting the first intermediate result to the first larger internal processor.

6. An internal processor comprising:
a plurality of eight bit arithmetic logic units (ALUs) comprising a first ALU, wherein the first ALU is configured to perform a first operation on a first operand and a second operand not explicitly implemented in circuitry of the first ALU; and
a plurality of input multiplexers communicatively coupled to the first ALU, wherein, to facilitate performing the first operation, the plurality of input multiplexers is configured to:
input a first 8-bit portion of the first operand and a second 8-bit portion of the second operand into the first ALU to enable the first ALU to perform a second operation on the first 8-bit portion of the first operand and the second 8-bit portion of the second operand during a first pass through the first ALU to determine a first 8-bit intermediate result; and
input the first 8-bit intermediate result into the first ALU to enable the first ALU to perform the second operation based at least in part on the first 8-bit intermediate result during a second pass through the first ALU after the first pass to facilitate determining a final result of the first operations;

wherein, when the first operation comprises a 16-bit multiplication operation, the plurality of input multiplexers is configured to:
input the first 8-bit portion of the first operand and the second 8-bit portion of the second operand into the first ALU to enable the first ALU to perform a first 8-bit multiplication operation on the first 8-bit portion of the first operand and the second 8-bit portion of the second operand during the first pass through the first ALU to determine a first 8-bit portion of a 32-bit final result, wherein the first pass comprises eight cycles;
input the first 8-bit portion of the first operand and a third 8-bit portion of the second operand to enable the first ALU to perform a second 8-bit multiplication operation on the first 8-bit portion of the first operand and the third 8-bit portion of the second operand based at least in part on the first 8-bit intermediate result during the second pass through the first ALU to determine a second 8-bit intermediate result and a third 8-bit intermediate result, wherein the second pass comprises eight cycles;
input a fourth 8-bit portion of the first operand and the second 8-bit portion of the second operand into the first ALU to enable the first ALU to perform a third 8-bit multiplication operation on the fourth 8-bit portion of the first operand and the second 8-bit portion of the second operand based at least in part on the second 8-bit intermediate result during a third pass through the first ALU after the second pass to determine a fourth 8-bit intermediate result and a second 8-bit portion of a 32-bit final result, wherein the third pass comprises eight cycles; and
input the fourth 8-bit portion of the first operand and the third 8-bit portion of the second operand into the first ALU to enable the first ALU to perform a fourth 8-bit multiplication operation on the fourth 8-bit portion of the first operand and the third 8-bit portion of the second operand based at least in part on the third 8-bit intermediate result and the fourth 8-bit intermediate result during a fourth pass through the first ALU after the third pass to determine a 16-bit portion of the 32-bit final result, wherein the fourth pass comprises eight cycles.

7. The internal processor, as set forth in claim 6, comprising:
a buffer configured to hold the first operand, the second operand, or both; and
a memory register configured to hold the first 8-bit intermediate result;
wherein the plurality of input multiplexers is configured to select between inputting an 8-bit portion of the first operand, an 8-bit portion of the second operand, and an 8-bit intermediate result to the first ALU.

8. The internal processor, as set forth in claim 6, wherein when the first operation comprises a NAND operation, the first ALU is configured to:
perform an AND operation on the first 8-bit portion of the first operand and the second 8-bit portion of the second operand during the first pass, wherein the first pass comprises a single cycle; and perform an INV operation on the first 8-bit intermediate result during the second pass to determine an 8-bit final result of the NAND operation, wherein the second pass comprises a single cycle.

9. The internal processor, as set forth in claim 6, wherein the plurality of eight bit arithmetic logic units comprise a second ALU configured to perform a second operation different from the first operation in parallel with the first operation.

10. The internal processor, as set forth in claim 6, wherein the internal processor is packaged with a memory device and configured to be controlled by a sequencer in the memory device.

11. An internal processor comprising:
a plurality of eight bit arithmetic logic units (ALUs) comprising a first ALU, wherein the first ALU is configured to perform a first operation on a first operand and a second operand not explicitly implemented in circuitry of the first ALU, wherein the first operation comprises a 16-bit multiplication operation; and
a plurality of input multiplexers communicatively coupled to the first ALU, wherein, to facilitate performing the first operation, the plurality of input multiplexers is configured to:
input a first 8-bit portion of the first operand and a second 8-bit portion of the second operand into the first ALU to enable the first ALU to perform a second operation on the first 8-bit portion of the first operand and the second 8-bit portion of the second operand during a first pass through the first ALU to determine a first 8-bit intermediate result, wherein the first pass comprises eight cycles and the plurality of input multiplexers is configured to input the first 8-bit portion of the first operand and the second 8-bit portion of the second operand into the first ALU to enable the first ALU to perform a first 8-bit multiplication operation on the first 8-bit portion of the first operand and the second 8-bit portion of the second operand during the first pass through the first ALU to determine a first 8-bit portion of a 32-bit final result;
input the first 8-bit intermediate result into the first ALU to enable the first ALU to perform the second operation based at least in part on the first 8-bit intermediate result during a second pass through the first ALU after the first pass to facilitate determining a final result of the first operation, wherein the second pass comprises eight cycles and the plurality of input multiplexers is configured to input the first 8-bit portion of the first operand and a third 8-bit portion of the second operand to enable the first ALU to perform a second 8-bit multiplication operation on the first 8-bit portion of the first operand and the third 8-bit portion of the second operand based at least in part on the first 8-bit intermediate result during the second pass through the first ALU to determine a second 8-bit intermediate result and a third 8-bit intermediate result;
input a fourth 8-bit portion of the first operand and the second 8-bit portion of the second operand into the first ALU to enable the first ALU to perform a third 8-bit multiplication operation on the fourth 8-bit portion of the first operand and the second 8-bit portion of the second operand based at least in part on the second 8-bit intermediate result during a third pass through the first ALU after the second pass to determine a fourth 8-bit intermediate result a second 8-bit portion of a 32-bit final result, wherein the third pass comprises eight cycles; and
input the fourth 8-bit portion of the first operand and the third 8-bit portion of the second operand into the first ALU to enable the first ALU to perform a fourth 8-bit multiplication operation on the fourth 8-bit portion of the first operand and the third 8-bit portion of the second operand based at least in part on the third 8-bit intermediate result and the fourth 8-bit intermediate result during a fourth pass through the first ALU after the third pass to determine a 16-bit portion of the 32-bit final result, wherein the fourth pass comprises eight cycles.

12. The internal processor, as set forth in claim 11, wherein the plurality of eight bit arithmetic logic units comprise a second ALU configured to perform a second operation different from the first operation in parallel with the first operation.

13. The internal processor, as set forth in claim 12, wherein, when the second operation comprises a NAND operation, the second ALU is configured to:
perform an AND operation on a third operand and a fourth operand during a first cycle to determine a second 8-bit intermediate result; and
perform an INV operation on the second 8-bit intermediate result during a second cycle after the first cycle to determine an 8-bit final result of the NAND operation.

14. The internal processor, as set forth in claim 12, wherein, when the second operation comprises a NAND operation, the plurality of input multiplexers is configured to:
input a third operand and a fourth operand into the second ALU to enable the second ALU to determine a second 8-bit intermediate result by performing an AND operation on the third operand and the fourth operand during a first cycle; and
input the second 8-bit intermediate result into the second ALU to enable the second ALU to determine an 8-bit final result of the NAND operation by performing an INV operation on the second 8-bit intermediate result during a second cycle after the first cycle.

* * * * *